Patented Dec. 11, 1951

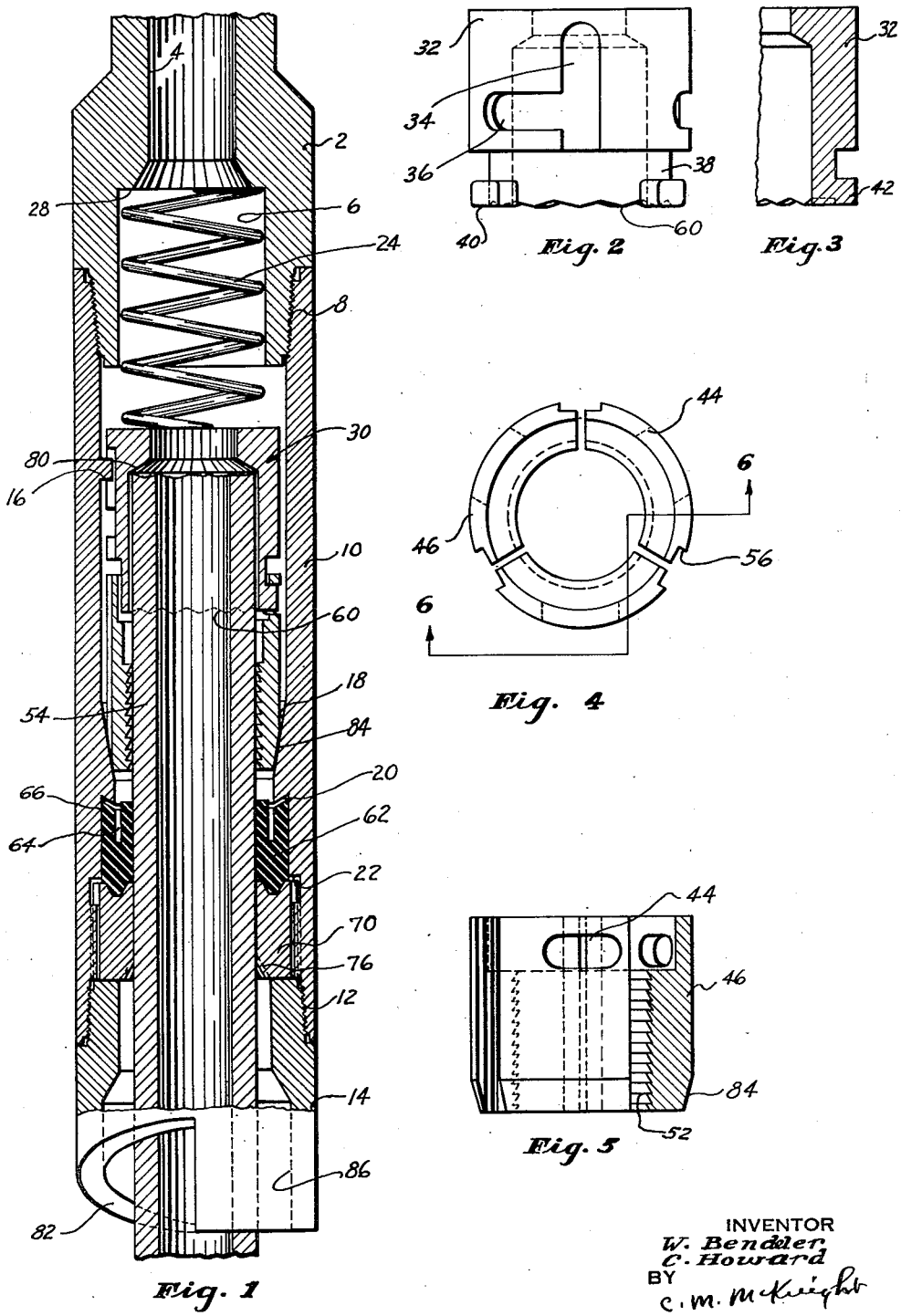

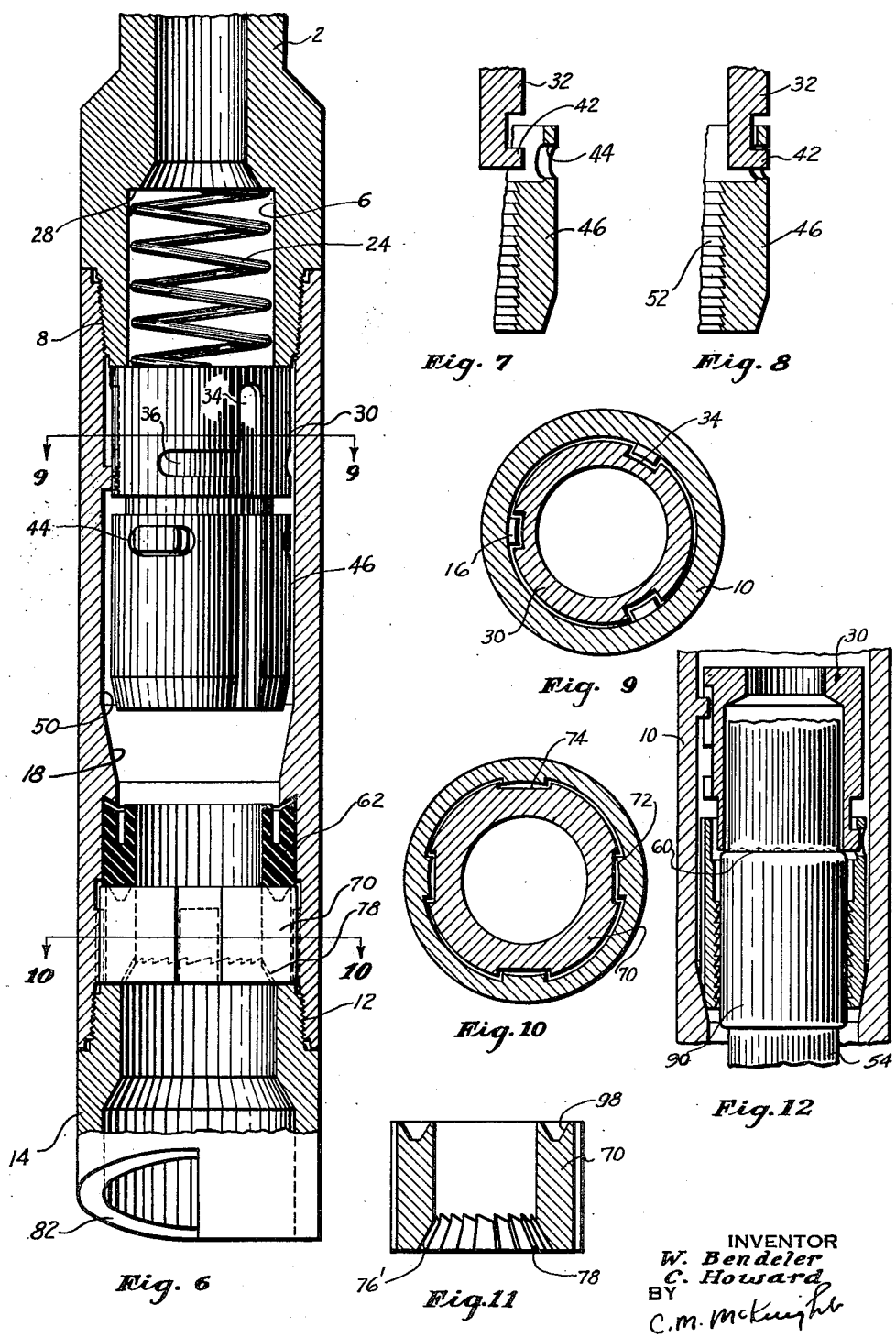

2,577,994

UNITED STATES PATENT OFFICE 2,577,994

OVERSHOT

William Bendeler and Clifford Howard,
Oklahoma City, Okla.

Application February 1, 1947, Serial No. 725,954

6 Claims. (Cl. 294—102)

This invention relates to a fishing tool for oil wells, and more particularly but not by way of limitation to an over shot for fishing out twisted off or cut off sections of drill pipe, casing, tubing, and the like in a well bore.

It is well known that in the drilling operation the various sections of drill pipe, tool joints, and the like become sheared off and must be removed from the well to continue the drilling operation. Furthermore, it has been found that when the fish is stuck and cannot be removed by one operation of the over shot, it is then necessary to provide an over shot that can be easily released from a connecting position with the over shot and removed from the well bore.

It is an important object of this invention to provide an over shot fishing tool for oil wells which has an easy and positive connection and release with a "fish" in a well bore.

A further object of this invention is to provide an over shot fishing tool which has a full opening to allow for cutting off or shooting off below the over shot tool with an inside cutter, thereby providing for cutting and removing of a large portion of the fish if desired.

And still another object of this invention is to provide a fishing tool adapted to enter a well bore in complete assembly that is capable of engaging larger diameter pipes than the conventional over shot of the present market due to the increased size of the bore in the over shot bowl.

And an additional object of this invention is to provide an over shot fishing tool for oil well bores which is efficiently and more positively packed off below the slips. Furthermore, the over shot fishing tool provides for milling off the top of the fish and preventing injury or damage to the packer, thereby eliminating an extra trip into the well bore with conditioning tools operating on the fish.

And still another object of this invention is to provide an over shot fishing tool which is simple and efficient in operation and particularly provides for easy removal or change of the slips engaging the fish when the slips become worn or different size slips are desired.

Other objects and advantages of the invention will be evident from the following detailed description, read in conjunction with the accompanying drawings, which illustrate my invention.

Referring to the drawings Figure 1 is a sectional elevational view of the over shot showing an engagement with the fish.

Figure 2 is a detail view of the latching cylinder.

Figure 3 is a detail view in section of a portion of the latching cylinder.

Figure 4 is a top plan view of the slips.

Figure 5 is a view taken on lines 6—6 of Figure 4.

Figure 6 is a sectional view, partly in elevation, showing the complete assembly of the over shot and with the slips is disengaging position.

Figure 7 is a detail view in section showing the non-engagement of the latching cylinder with the slips.

Figure 8 is a similar view showing an engaging position.

Figure 9 is a view taken on lines 9—9 of Figure 6.

Figure 10 is a view taken on lines 10—10 of Figure 6.

Figure 11 is a detail view in section of the mill for the over shot.

Figure 12 is a detailed sectional view showing the application with a tubing collar.

Referring to the drawings in detail and more particularly Figures 1 and 6, the over shot comprises a cylindrical member 2 having an upper bore 4 communicating with a lower bore 6 of increased diameter for purposes as will be hereinafter set forth. The cylinder 2 is commonly termed the top sub portion of the over shot assembly and is threadedly connected at 8 with a cylindrical member 10 or over shot bowl which in turn is threaded at 12 to a lower sub or cylindrical guide 14. The inner periphery of the over shot bowl 10 is provided with inwardly projecting lugs or dogs 16 for a purpose as will be hereinafter set forth. As clearly shown in Figure 9, three circumferentially spaced lugs are preferable, however, it will be apparent any convenient number may be provided. The inner periphery of the bowl 10 at a point below the lugs 16 is tapered as at 18 to provide a shoulder 20 for a purpose as will be hereinafter set forth. A second shoulder 22 is provided in the bore of the bowl 10 at a point below the shoulder 20 for a purpose as will be hereinafter set forth. A helical spring 24 is disposed in the bore 6 having one end anchored on shoulders 28 provided by the variance in diametrical dimensions of the bores 4 and 6. The opposite end of the spring rests on the top of a latching cylinder 30 adapted to be disposed in the bore of the over shot bowl 10 as will now be set forth.

The latching cylinder comprises a cylindrical member having an upper body portion 32 provided with a plurality (preferably three) of circumferentially spaced vertical slots 34. Each slot 34 communicates with a horizontal slot 36 for a purpose as will be hereinafter set forth. An intermediate body portion 38 of smaller diameter than body 32 extends downward therefrom and is provided with an outstanding circular flange portion 40 having a plurality of circumferentially spaced lugs 42 (preferably three) adapted to cooperate with complementary spaced apertures 44 provided in the top of each of the plurality of slips 46 connected thereto as will be hereinafter set forth. It will be apparent that the circumferentially spaced longitudinally disposed slots 34 are adapted to cooperate with the complementary spaced dogs 16 in order to position the latching cylinder 30 within the bore 50 of the bowl 10 and prevent rotation thereof during any rotation of the over shot in operation.

As heretofore set forth, the slips 46 are connected to the flange of the latching cylinder 30 by the lugs 42. The slips are preferably three in number although any convenient variable number may be utilized. The slips are arranged in segmental relationship within the bore 50 and are provided with a plurality of serrations 52 on the inner periphery thereof for engagement with a fish 54 as will be hereinafter set forth. It will be understood that the term "fish" as termed in the oil industry defines a broken off or sheared portion of drill pipe, tubing, or tool joint or the like in a well hole. Each circular end portion of the slips 46 is provided with cut away portions 53 complementary to each other, as shown in Figure 4, which are circumferentially spaced in complement to the dogs 16 in order to allow movement of the slips into the bore 50 of the over shot bowl during assembly. A plurality of undulated teeth members 60 are provided on the under face of the body portion 32 of the latching cylinder 30 for a purpose to be hereinafter set forth. The shoulder 20 provided by the tapered portion 18 of the bowl 10 is cut on a bias or angle, as clearly shown in Figure 1, in order to receive a rubber packing 62. The packing 62 is provided with a circular recess or groove 64 providing a bifurcated portion 66 cooperating with the under face of the shoulder 20 for a purpose as will be hereinafter set forth. A cylindrical mill 70, clearly shown in Figures 1 and 11, is disposed immediately below the rubber packing 62. The bore 50 at this point is provided with a plurality (preferably four) of circumferentially spaced and longitudinally disposed dogs 72 (Figure 10) adapted to cooperate with complementary spaced slots 74 provided on the outer periphery of the cylindrical mill 70. The mill 70 is secured in the over shot assembly between shoulder 22 and the lower guide 14 as at 76 due to the threaded connection 12.

Operation

The bore 4 of the top sub 2 is preferably threaded (not shown) to be connected with a tool joint (not shown) for lowering the over shot assembly into a well bore. The assembled over shot is lowered into the bore to a point where the slips 46 encircle and ride over the fish 54. It will be apparent that the over shot assembly is rotating from the tool joint and that mud circulation of the pump is present. As the slip enters the over shot bowl 10 the mill 70 is provided with a tapered inner periphery 76' having a plurality of milling teeth 78 adapted to mill or condition the top 80 of the fish 54 and thereby prevent any injury to the rubber packing 62 during movement of the over shot over the fish. Furthermore, the lower face of the guide member 14 is preferably formed with a cam surface 82 allowing for easy contact and guiding of the fish into the over shot bowl.

In lowering the over shot in complete assembly into the well bore the dogs 16 are usually in the vertical slots 34, and the slips 46 are secured to the lugs 42 of the latching cylinder. The over shot is lowered over the fish until the serrations 52 of the slips are brought into frictional contact with the outer periphery of the fish 54. The tension of the helical spring 24 positions the taper 84 of the slips against the tapered bore 18 to provide a positive biting connection of the serrations 52 with the fish. It will be apparent that if the fish is not stuck in the bore, the over shot assembly may then be moved vertically upward through the well carrying the fish therealong. The rubber packing 62 acts as a seal to direct the fluid circulation through the fish and into the well bore in order to assist the release of the fish from the strata of the well bore. Fluid circulation particularly eliminates sand deposits and other debris which would cause the fish to stick, thereby decreasing the difficulty of removing the fish from the well bore. It will be noted that the slot 64 provides for the fluid pressure in two directions in that the packer 62 is forced against the inner periphery of the bowl 10 and the outer periphery of the fish to effect a more efficient seal.

With the over shot in engagement over the fish it is sometimes evident that the fish is lodged or stuck in the well hole to such an extent that it cannot be removed, and in such condition it is necessary to release the over shot assembly from engagement therefrom. The release operation necessitates dropping the drill pipe from the top of the well, thereby placing the complete weight of the drill stem on the over shot assembly, which causes downward movement of the over shot bowl, thereby moving the tapered portion 18 of the bowl away from contact with the tapered portion 84 of the slips 46. It will be apparent from Figure 1 that during this latter movement of the over shot bowl 10, the shoulders 80 of the latching cylinder bear against the top of the fish to prevent downward movement of the cylinder and slips. Furthermore, this movement of the over shot bowl compresses the helical spring 24 acting against the top of the latching cylinder 32 to preclude vertical movement of the latching assembly 30. As the weight of the drill stem moves the bowl 10 downward, the dogs 16 simultaneously move downward in the vertical slots 34, thereby placing them in position to enter the horizontal slots 36 of the cylinder 32. A right hand turn of the drill stem and over shot bowl 10 will position the dogs 16 in the slots 36, whereupon the latching cylinder 32 and the slips 46 may be removed from the bore with the over shot assembly. Breaking of the contact between the tapered portions 18 and 84 relieves the biting connection of the serrations 52 against the fish to provide a release position for the slips. During rotation of the drill pipe and over shot 10, the dogs 16, and undulated teeth 60 between the cylinder 32 and the slips 46 prevent rotation of the cylinder 32 and the slips 46. It will be apparent that with the dogs positioned in the slots 36, the drill pipe may be picked up at the well surface and the complete over shot assembly, including the latching cylinder 32 and the slips 46, are removed from the well.

A particular advantage of the present device is that the bores 6, 18, and 86, are of sufficient diameter to allow for the insertion of an inside cutting tool. Such a tool is necessary when the fish is lodged or stuck and it is desired to cut off or shear top portions thereof which may be removed by the over shot assembly. Furthermore, it will be apparent that the shearing operations may be done progressively and thereby eventually provide for the complete removal of any lodged fish from the well bore.

Figure 12 discloses the application of the over shot with a connecting collar or tool joint 90 utilized between sections of tubing, drill pipe and the like. It is to be noted that the outer diameter of the collar 90 is such as to abut against the lower end of the cylinder flange 40 and preclude movement of the collar into the latching cylinder 30, whereby the slips 46 are permitted positive engagement therewith.

From the foregoing it will be apparent that the present invention provides an over shot fishing tool for oil wells which permits a positive and efficient contact with the fish in the well bore in order to remove the fish therefrom. Furthermore, in cases where the fish is stuck and cannot be removed, the fishing tool can be easily and efficiently released from engagement with the fish and removed from the well bore. In addition, the fishing tool provides an internal bore of sufficient diameter to allow for the insertion of an inside cutting tool adaptable to cut off the upper portions of a stuck or lodged fish and permit removal of them progressively from the bore. The device further contemplates a more efficient sealing of the fluid circulation through the bifurcated packer member and at the same time provides for a milling of the top portion of the fish over which the fishing tool is moved in order that the top portion will not in any manner distort or disrupt the packing seal.

Changes may be made in the specifications and drawings without departing from the spirit of the invention within the scope of the following claims as set forth.

What we claim is:

1. In an over shot apparatus for removing a broken off element from a well bore comprising a segmental cylindrical bowl adapted to be lowered over the element, a latching assembly disposed in the bowl and comprising a latching cylinder having a plurality of serrated slips carried thereby, a tapered portion provided in the bowl cooperating with a tapered portion on the slips to effect a gripping engagement of the slips with the element, means anchored above the latching assembly for urging the tapered portion of the slips into contact with the tapered portion of the bowl, means provided in the bowl and cooperating with the latching cylinder to prevent rotation thereof during contact between the tapered portions, means cooperating with the second mentioned means permitting downward movement of the bowl relative to the latching cylinder to effect a release of the slips from the element, means permitting rotation of the bowl relative to the latching cylinder to permit removal of the over shot from the well bore, and means disposed in the bowl below the slips for milling the top of the element during the movement of the apparatus over the element, and sealing means provided in the bowl to provide a fluid tight seal between the bowl and the outer surface of the element.

2. In an over shot apparatus for removing a broken off element from a well bore comprising a segmental cylindrical bowl adapted to be lowered over the element, a latching assembly disposed in the bowl and comprising a latching cylinder having a plurality of serrated slips carried thereby, a tapered portion provided in the bowl cooperating with a tapered portion on the slips to effect a gripping engagement of the slips with the element, a helical spring anchored above the latching assembly for urging the tapered portion of the slips into contact with the tapered portion of the bowl, means provided in the bowl and cooperating with the latching cylinder to prevent rotation thereof during contact between the tapered portions, means cooperating with the first mentioned means permitting downward movement of the bowl relative to the latching cylinder to effect a release of the slips from the element, means permitting rotation of the bowl relative to the latching cylinder to permit removal of the over shot from the well bore, a packer having bifurcated portions disposed in the bowl below the slips adapted to apply pressure in two directions for sealing off fluid circulation, and a cylindrical mill for conditioning the top of the element during movement of the apparatus thereover.

3. In an over shot apparatus for removing a broken off element from a well bore comprising a segmental cylindrical bowl adapted to be lowered over the element, a latching assembly disposed in the bowl and comprising a latching cylinder having a plurality of serrated slips carried thereby, a tapered portion provided in the bowl cooperating with a tapered portion on the slips to effect a gripping engagement of the slips with the element, a helical spring anchored above the latching assembly for urging the tapered portion of the slips into contact with the tapered portion of the bowl, means provided in the bowl and cooperating with the latching cylinder to prevent rotation thereof during contact between the tapered portions means cooperating with the first mentioned means permitting downward movement of the bowl relative to the latching cylinder to effect a release of the slips from the element, means permitting rotation of the bowl relative to the latching cylinder to permit removal of the over shot from the well bore, and a cylindrical mill disposed in the bowl below the slips having a plurality of teeth for conditioning the top of the element during movement of the apparatus over the element.

4. In an over shot apparatus for removing broken off drill pipe and the like from a well bore comprising a cylindrical bowl having upper and lower cylindrical members connected thereto, a latching assembly disposed in the bowl and comprising a latching cylinder having a plurality of serrated slips carried thereby and adapted to be lowered over the broken off pipe, a tapered portion provided in the bowl cooperating with a tapered portion on the slips to effect a gripping engagement of the slips with the pipe, a helical spring anchored above the latching assembly for urging the tapered portion of the slips into contact with the tapered portion of the bowl, a plurality of circumferentially spaced dogs on the bowl and extending inwardly therefrom adapted to cooperate with vertical slots in the latching cylinder to prevent rotation thereof during contact between the tapered portions, said slots permitting downward movement of the cylindrical bowl relative to the latching cylinder bowl to break the contact of the tapered portion and effect a release of the slips from the pipe, horizontal slots cooperating with the vertical slots adapted to receive the dogs in their downward position by rotation of the bowl relative to the latching cylinder to effect a removal of the over shot apparatus from the well bore.

5. In an over shot apparatus for removing broken off drill pipe and the like from a well bore comprising a cylindrical bowl having upper and lower cylindrical members connected thereto, a latching assembly disposed in the bowl and comprising a latching cylinder having a plurality of serrated slips carried thereby and adapted to be lowered over the broken off pipe, a tapered portion provided in the bowl cooperating with a tapered portion on the slips to effect a gripping engagement of the slips with the pipe, a helical spring anchored above the latching assembly for urging the tapered portion of the slips into contact with the tapered portion of the bowl, a plurality of circumferentially spaced dogs on the bowl and extending inwardly therefrom adapted to cooperate with vertical slots in the latching cylinder to prevent rotation thereof during contact between the tapered portions, said slots permitting downward movement of the cylindrical bowl relative to the latching cylinder bowl to break the contact of the tapered portion and effect a release of the slips from the pipe, horizontal slots cooperating with the vertical slots adapted to receive the dogs in their downward position by rotation of the bowl relative to the latching cylinder to effect a removal of the over shot apparatus from the well bore, and means to prevent rotation of the latching assembly during the rotation of the bowl.

6. In an over shot apparatus for removing broken off drill pipe and the like from a well bore comprising a cylindrical bowl having upper and lower cylindrical members connected thereto, a latching assembly disposed in the bowl and comprising a latching cylinder having a plurality of serrated slips carried thereby and adapted to be lowered over the broken off pipe, a tapered portion provided in the bowl cooperating with a tapered portion on the slips to effect a gripping engagement of the slips with the pipe, a helical spring anchored above the latching assembly for urging the tapered portion of the slips into contact with the tapered portion of the bowl, a plurality of circumferentially spaced dogs provided in the bowl adapted to cooperate with vertical slots in the latching cylinder to prevent rotation thereof during contact between the tapered portions, said slots permitting downward movement of the cylindrical bowl relative to the latching cylinder bowl to break the contact of the tapered portion and effect a release of the slips from the pipe, horizontal slots cooperating with the vertical slots adapted to receive the dogs in their downward position by rotation of the bowl relative to the latching cylinder to effect a removal of the over shot apparatus from the well bore, and a fluid seal disposed in the bowl below the slips to seal off fluid circulation, and milling means disposed in the bowl below the fluid seal to condition the top of the pipe during the lowering of the over shot over the pipe.

WILLIAM BENDELER.
CLIFFORD HOWARD.

REFERENCES CITED

The following references are of record in the file of this patent:

UNITED STATES PATENTS

| Number | Name | Date |
|---|---|---|
| 2,070,869 | Sorensen | Feb. 16, 1937 |
| 2,187,481 | Baker et al. | Jan. 16, 1940 |
| 2,394,832 | Young | Feb. 12, 1946 |